US010503438B1

(12) United States Patent
La Fratta et al.

(10) Patent No.: US 10,503,438 B1
(45) Date of Patent: Dec. 10, 2019

(54) MEMORY SUB-SYSTEM SUPPORTING NON-DETERMINISTIC COMMANDS

(71) Applicant: Micron Technology, Inc., Boise, ID (US)

(72) Inventors: Patrick A. La Fratta, McKinney, TX (US); Robert Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/111,869

(22) Filed: Aug. 24, 2018

(51) Int. Cl.
*G06F 12/00* (2006.01)
*G06F 3/06* (2006.01)
*G06F 13/18* (2006.01)
*G06F 13/16* (2006.01)

(52) U.S. Cl.
CPC ............ *G06F 3/0659* (2013.01); *G06F 3/061* (2013.01); *G06F 3/0679* (2013.01); *G06F 13/1673* (2013.01); *G06F 13/18* (2013.01)

(58) Field of Classification Search
None
See application file for complete search history.

(56) References Cited

U.S. PATENT DOCUMENTS

| 8,115,773 B2 * | 2/2012 | Swift | G06T 15/005 345/501 |
| 2014/0173162 A1 * | 6/2014 | Danis | G06F 13/32 710/310 |
| 2015/0347036 A1 * | 12/2015 | Hunter | G11C 11/40611 711/106 |

* cited by examiner

Primary Examiner — John A Lane
(74) Attorney, Agent, or Firm — Schwegman Lundberg & Woessner, P.A.

(57) ABSTRACT

A first non-deterministic read command from a command queue is selected to be issued. The command queue includes non-deterministic read commands including the first non-deterministic read command that are outstanding and placed in the wait state simultaneously. A first intermediate response from a non-volatile memory component is received that indicates that data associated with one of the outstanding non-deterministic read commands is available. A first send command is inserted into a send queue when the first intermediate response is received. The first send command is selected from the send queue to be issued and removed from the send queue. A response to a corresponding non-deterministic read command is received. The corresponding non-deterministic read command is one of the outstanding non-deterministic read commands. The response indicates the corresponding non-deterministic read command and includes data associated with corresponding non-deterministic read command. The corresponding non-deterministic read command is removed from the command queue.

20 Claims, 6 Drawing Sheets

US 10,503,438 B1

MEMORY SUB-SYSTEM SUPPORTING NON-DETERMINISTIC COMMANDS

TECHNICAL FIELD

Embodiments of the disclosure relate generally to memory sub-systems, and more specifically, relate to memory sub-systems that support non-deterministic commands with out-of-order responses to memory components.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to a memory sub-system supporting non-deterministic commands to memory components. A memory sub-system is also hereinafter referred to as a "memory device". An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

The memory sub-system can include multiple memory components that can store data from the host system. The multiple memory components can be volatile memory components, non-volatile memory components, or a combination of such. Commands to volatile memory components can be referred to as deterministic commands while commands to non-volatile memory components can be referred to as non-deterministic commands Conventional memory controllers support the out-of-order completion of commands to allow for different volatile memory components (e.g., dynamic random access memory (DRAM)) types connected to different ranks of the same channel. The conventional memory controller function relies on the assumption that any set of read commands for a specific rank will get responses in the order that the read commands were issued to that rank.

However, recent protocols for non-volatile memory components, such as non-volatile dual in-line memory module protocol (NVDIMM-P), enable the connection of non-volatile memory components alongside the volatile memory components (e.g., DRAM) on the same channel. When scheduling commands using protocols like NVDIMM-P, the assumption on which the conventional memory controller relies no longer holds. In other words, non-deterministic read commands issued to the same rank can return out-of-order responses such that the conventional memory controllers cannot support these recent protocols for non-volatile memory components.

Aspects of the present disclosure address the above and other deficiencies by having a memory sub-system that includes extensions to the command queue and scheduling logic of the memory controller to support non-deterministic commands such as NVDIMM-P. These extensions allow for the efficient scheduling of the non-deterministic commands without having detrimental effects on the scheduling of deterministic commands to volatile memory components such as DRAM. Further, these extensions are not detrimental to the operation of memory controllers' existing command scheduling policies (e.g., first-ready, first-come, first-service (FRFCFS)) for quality-of-service (QoS) that use the order of arrival and other command state information for scheduling purposes.

Figure 1:
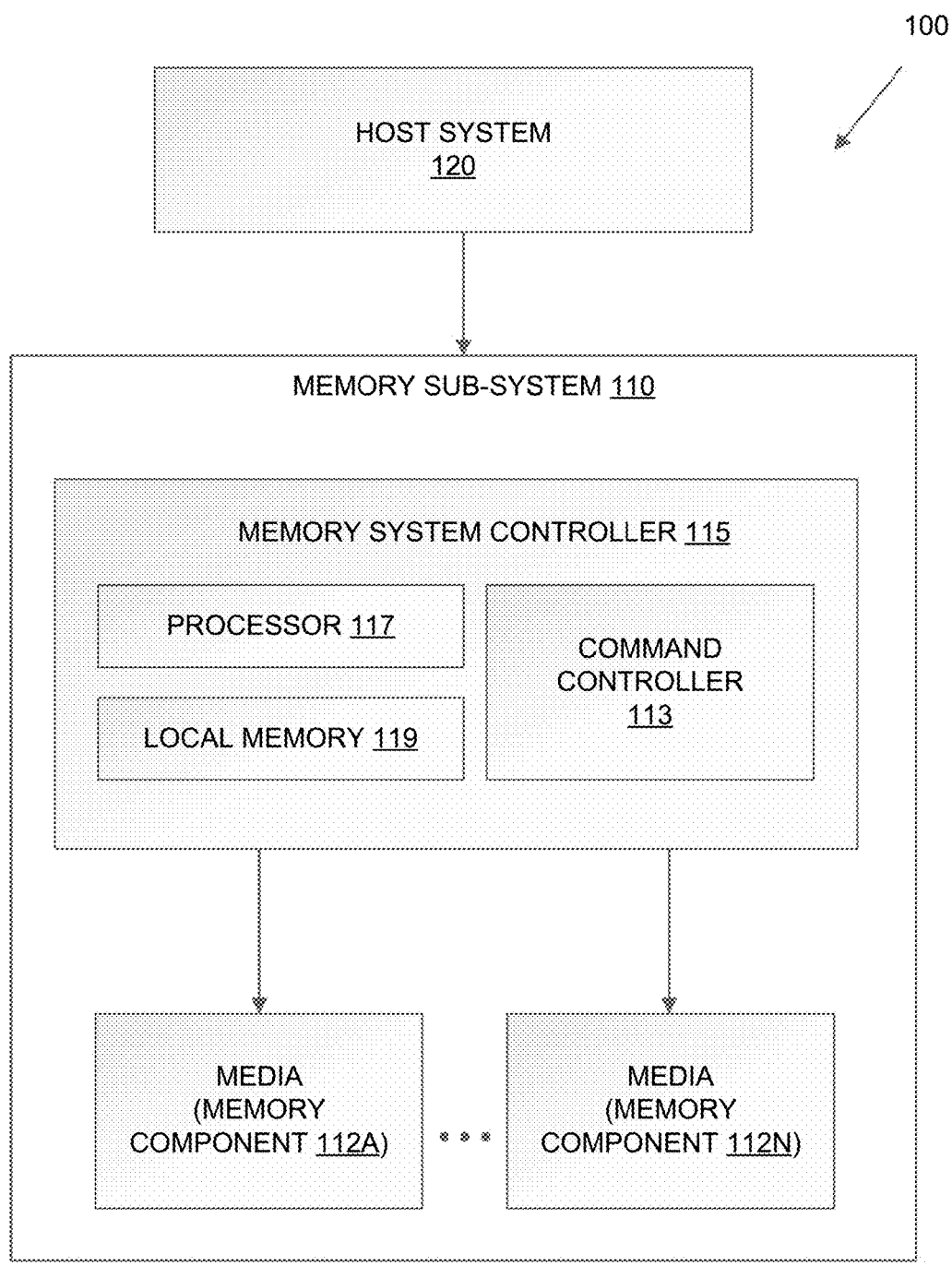
FIG. 1 illustrates an example computing environment that includes a memory sub-system in accordance with some embodiments of the present disclosure.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data. In one example embodiment, the memory components 112A to 112N can also include non-volatile dual in-line memory module (NVDIMM).

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The commands from the host system 120 can include deterministic commands to memory components 112A to 112N that are volatile memory components and non-deterministic commands to memory components 112A to 112N that are non-volatile memory components. The deterministic commands can be, for example, a row activation (ACT), a read command (READ), and a write command (WRITE) to the volatile memory components. The non-deterministic commands can be, for example, NVDIMM-P commands such as read commands (XREAD), write commands (XWRITE), intermediate response (RSP_N), dummy read command, response to the dummy read command, send command, etc.

The memory sub-system 110 includes a command controller 113 that can be used support non-deterministic commands received from the host system 120. In some embodiments, the controller 115 includes at least a portion of the command controller 113. For example, the controller 115 can include a processor 117 (processing device) configured to execute instructions stored in local memory 119 for performing the operations described herein. In some embodiments, the command controller 113 is part of the host system 110, an application, or an operating system.

The command controller 113 provides an extension to the command queue and the scheduling logic of the controller 115 to enable support for non-deterministic commands to memory components 112A to 112N of the memory sub-system 110. The memory components 112A to 112N include one or more non-volatile memory components and one or more volatile memory components. One non-volatile memory component such as NVDIMM is placed in one rank of a channel and the one or more volatile memory components such as DRAM are placed in the other ranks of the same channel. The command controller 113 can include non-deterministic send queues for each rank of the channel, dummy read outstanding ("DRO") registers for each rank of the channel, write credits registers for each rank of the channel, and non-deterministic read queues for each rank of the channel. In one example embodiment, the send queues are provided for each rank of the channel to allow for handling intermediate responses to non-deterministic commands, send commands, and out-of-order non-deterministic read responses. In one example embodiment, the DRO registers and the write credit registers are provided for each rank of the channel to ensure proper transmission of the dummy read commands and to avoid write buffer overflows. Using these structures, the command controller 113 allows for the interleaving in the command queue of deterministic commands to the memory components 112A to 112N that are volatile and non-deterministic commands with out-of-order responses to the memory components 112A to 112N that are nonvolatile. Further details with regards to the operations of the characteristic component 113 are described below.

Figure 2:
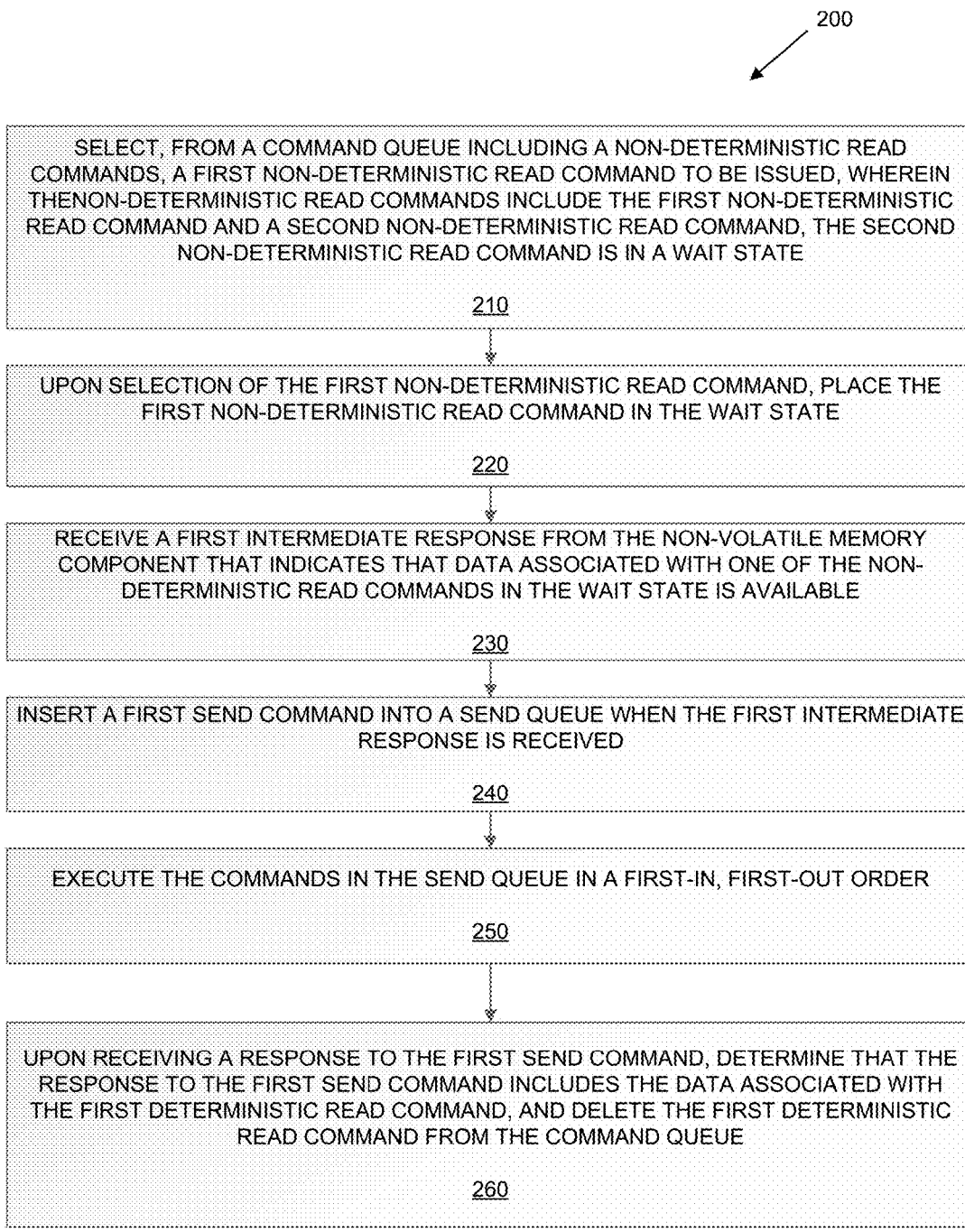
FIG. 2 is a flow diagram of an example method to support non-deterministic read commands in a memory sub-system in accordance with some embodiments of the present disclosure.

FIG. 2 is a flow diagram of an example method 200 to support non-deterministic read commands in a memory sub-system in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the command controller 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing device selects a first non-deterministic read command from a command queue to be issued. The command queue can include a plurality of non-deterministic read commands including the first non-deterministic read command and a second non-deterministic read command. The second non-deterministic read command can be in a wait state.

Upon selection of the first non-deterministic read command, at operation 220, the processing device places the first non-deterministic read command in the wait state. At this stage, both the first and the second non-deterministic read commands are in the wait state simultaneously. The first and the second non-deterministic read commands in the wait state are also referred to as being outstanding commands.

The command queue includes deterministic commands and non-deterministic commands that are interleaved in the command queue. In one example embodiment, responses to the non-deterministic commands are received out-of-order. Non-deterministic commands can be for example NVDIMM-P commands. In this example, the non-deterministic read commands are XREAD commands and the first intermediate response is a RSP_N command. The command queue can also include one or more non-deterministic read commands including the first non-deterministic read command that are outstanding and placed in the wait state simultaneously. To maintain an order of arrival, the non-deterministic read commands that are in the wait state remain in the command queue, but the processing device can no longer select to issue the non-deterministic read commands in the wait state. The wait state for non-deterministic commands is similar to an activate command for a volatile memory component.

At operation 230, the processing device receives a first intermediate response from a non-volatile memory component included in memory components 112A to 112N. The first intermediate response indicates that data associated with one of the non-deterministic read commands in the wait state is available or ready for transmission from one non-volatile memory component. In one example embodiment, the intermediate responses (e.g., RSP_N in the NVDIMM-P protocol) enable the behavior of non-deterministic read commands issued to the same rank to return out-of-order responses for those non-deterministic read commands. To avoid data bus collisions, the processing device receives the intermediate responses for each non-deterministic read command on a separate bus. When the processing device receives the first intermediate response and there are multiple outstanding non-deterministic read commands to the same rank, the processing device does not have knowledge of which outstanding non-deterministic read command's data is ready for transmission.

At operation 240, the processing device inserts a first send command into a send queue when the first intermediate response is received. In one example embodiment, the processing device inserts the first send command into the send queue of the rank associated with the first intermediate response. In this embodiment, the first send command inserted into the send queue of the rank associated with the first intermediate response ensures that the first send command is made available without changing the ordering of the commands in the command queue. In one example embodiment, after operation 230, the processing device can select any deterministic command from the command queue based on the selection policy being implemented.

In one example embodiment, the processing device selects a first deterministic command included in the command queue to be issued. The first deterministic command can be a row activation (ACT), a read command (READ), or a write command (WRITE). When the first deterministic command is a row activation (ACT), upon selecting the first deterministic command, the processing device places the first deterministic command in the wait state, and when the first deterministic command is complete, the processing device removes the first deterministic command from the command queue.

When the first deterministic command is a read command (READ) or a write command (WRITE), upon selecting the first deterministic command, removing the first deterministic command from the command queue.

At operation 250, the processing device executes the commands in the send queue in a first-in, first out (FIFO) order. In one example embodiment, the processing device selects the first send command from the send queue to be issued and removed from the send queue. The send queue can include one or more send commands including the first send command that are simultaneously outstanding. The one or more send commands in the send queue are scheduled for servicing with priority based on a selection policy. The send queue for each rank of the channel can be serviced based on first-in, first-out order (FIFO) in the send queue. In one example embodiment, the send command indicates to a non-volatile memory component to transmit the data corresponding to a non-deterministic read command that is ready to for transmission.

Upon receiving a response to the first send command, at operation 260, the processing device determines that the response to the first send command includes the data associated with the first deterministic read command and deletes the first deterministic read command from the command queue. In one example embodiment, the response indicates the corresponding non-deterministic read command. In other words, the response identifies the outstanding non-deterministic read commands with which it is associated. Accordingly, when there are multiple outstanding non-deterministic read commands to the same rank, the processing device only knows which of the outstanding non-deterministic read commands can be retired from the command queue once the processing device receives the response to the issued send command.

In one example embodiment, with the command queue including interleaved deterministic commands and non-deterministic commands with out-of-order responses, the processing device can support the non-deterministic commands with out-of-order responses without interfering with the issuance of deterministic commands to ranks associated with the volatile memory components (e.g., DRAM). In one example embodiment, the processing device can select and issue the deterministic commands before or after any of the operations within the method 200.

Figure 3:
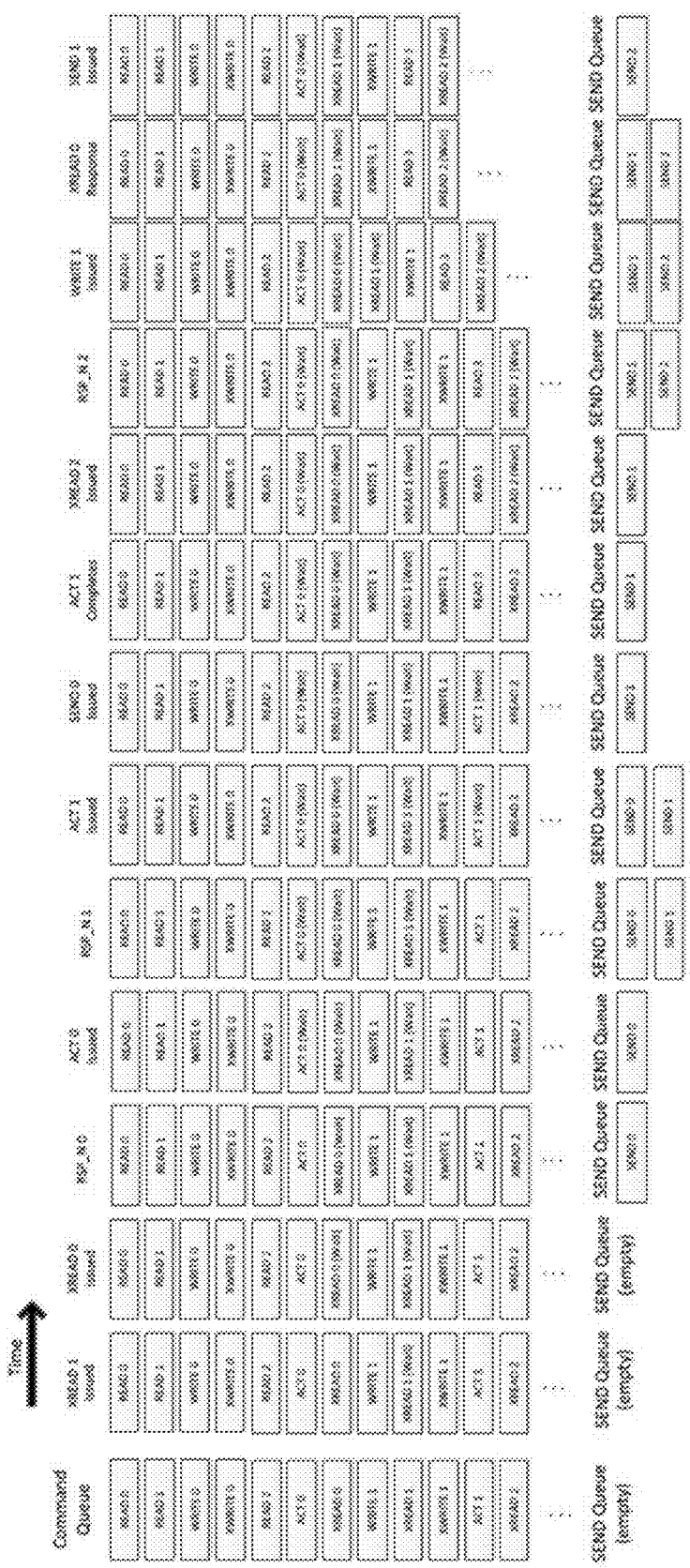
FIG. 3 is an example of the command controller supporting commands in a command queue, including a non-deterministic read command (XREAD) in accordance to some embodiments of the present disclosure.

FIG. 3 is an example of the command controller supporting commands in a command queue, including a non-deterministic read command (XREAD) in accordance to some embodiments of the present disclosure.

As shown in FIG. 3, the non-deterministic commands (e.g., XREAD and SEND commands) are interleaved with deterministic commands (e.g., ACT and WRITE to DRAM) of the command queue in this example embodiment.

At the second time step (e.g., second column), the command controller selects XREAD 1 for issuance, and places it in the wait state. At the third time step (e.g., third column), the command controller selects XREAD 0 for issuance and places it in the wait state. Commands in the wait state are also referred to as being outstanding.

In this example, both XREAD 1 and XREAD 0 are in the wait state simultaneously in the command queue. By setting the commands in the wait state, the command controller will know not to select these commands again for issuance. However, the command controller leaves these commands in the queue to maintain the commands' order of arrival for scheduling future commands.

At the fourth time step (e.g., fourth column), the command controller receives an intermediate response (RSP_N 0) from at least one of the non-volatile memory components (e.g., NVDIMM-P devices). In FIG. 3, the notation RSP_N 0 does not indicate that this intermediate response corresponds to XREAD 0 but rather that it is an indication that this is the first intermediate response received by the command controller (e.g., order position 0).

At this point in time (i.e., fourth time step), the NVDIMM-P device sending the intermediate response is indicating that data is available for one of the XREADs in the wait state (e.g., XREAD 0 or XREAD 1), but the command controller receiving this intermediate response (e.g., RSP_N 0) does not have an indication of which one of the XREADs in the wait state. Upon receiving the intermediate response (RSP_N 0), the command controller pushes a SEND command into the SEND queue.

In this example, the command controller next issues ACT 0 to a volatile component (e.g., DRAM device) and places that deterministic command (ACT 0) in a wait state at the fifth time step (e.g., fifth column). In this example, at this point in time (e.g., fifth time step), although a SEND command is in the command queue, the command selection logic determines that the ACT 0 should be selected before the pending SEND command. In one example embodiment, the command controller selects this deterministic command (ACT 0) based on the selection policy being implemented.

Next, at the sixth time step, the command controller receives a second intermediate response (e.g., RSP_N 1) from the non-volatile memory component (e.g. NVDIMM-P devices), indicating that data is available for another XREAD command in the wait state. Since there are two XREAD commands in the wait state and two intermediate responses received, the data are ready for both XREAD commands that are in the wait state.

At the seventh time step, the command controller issues the deterministic command (ACT 1) to a volatile memory component (e.g., DRAM device) and places that deterministic command in a wait state. In one example embodiment, the command controller selects this deterministic command (ACT 1) based on the selection policy being implemented.

In the next time step, the command controller selects an available SEND command, issues it, and removes it from the SEND queue. In this example, while the SEND command is in-flight, ACT 1 completes and the corresponding queue entry (ACT 1) is converted to the column command READ 3. In other words, the ACT 1 in the wait state is removed from the command queue and replaced by a new command (e.g., deterministic command READ 3).

At the next time step, the command controller selects non-deterministic read command (XREAD 2) for issue, and immediately receives an intermediate response (RSP_N 2), at which point the command controller inserts another SEND command into the SEND queue.

The column command XWRITE 1 is next issued, after which the response for a SEND command is received which is the response to XREAD 0 (e.g., XREAD 0 Response). As shown in FIG. 3, although the XREAD 0 command was issued after XREAD 1 command, the data corresponding to XREAD 0 was returned prior to XREAD 1's data.

The command controller then removes XREAD 0 from the command queue, since the command is done being serviced. At the final time step shown in FIG. 3, the command controller selects a SEND command for issuance and removes it from the SEND queue.

Figure 4:
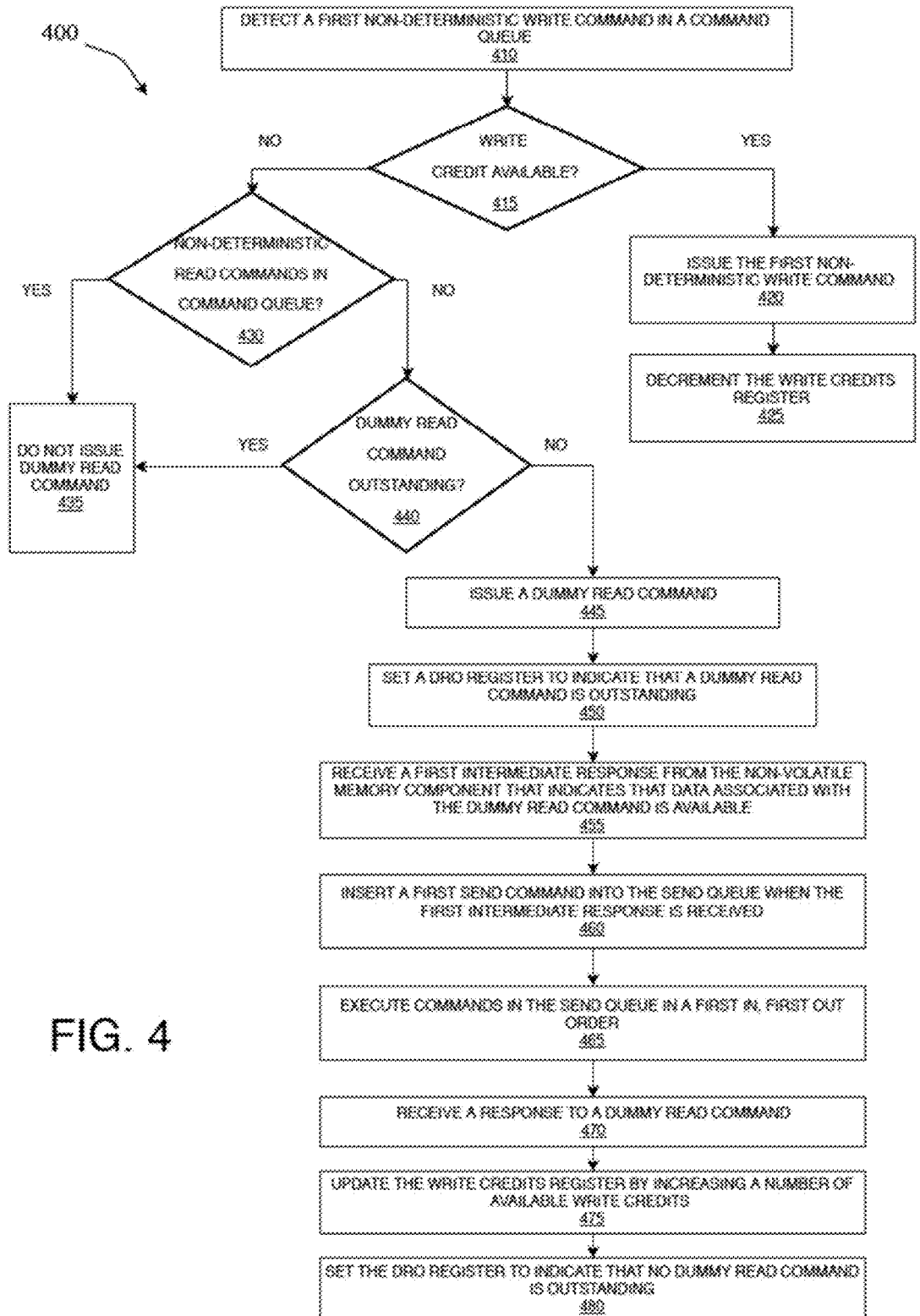
FIG. 4 is a flow diagram of an example method to support non-deterministic write commands in a memory sub-system in accordance with some embodiments of the present disclosure.

FIG. 4 is a flow diagram of an example method 400 to support non-deterministic write commands in a memory sub-system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the command controller 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In one example embodiment, the method 200 in FIG. 2 and method 400 in FIG. 4 can also be combined.

At operation 410, the processing device detects a first non-deterministic write command in a command queue. The first non-deterministic write command is a non-deterministic command received from the host system 120. The first non-deterministic write command can be an NVDIMM-P XWRITE command.

At operation 415, the processing device determines if there is a write credit available in the write credits register. In one example embodiment, the write credits register being assessed is the write credits register of the rank corresponding to the first non-deterministic write command.

Since the data associated with a non-deterministic write command takes some non-deterministic amount of time to be committed to the non-volatile memory component, the write credits ensure that a limited number of non-deterministic write commands are buffered at a time. To prevent the processing device from overrunning the buffers holding the data associated with the non-deterministic write commands, the processing device is provided with a number of write credits that indicate the buffer space that is available. For example, if the number of write credits reaches 0, the processing device can no longer issue non-deterministic write commands until the number of write credits is increased.

If the processing device determines that write credits are available at operation 415, at operation 420, the processing device issues the first non-deterministic write command. At operation 425, the processing device decrements the write credits register. For example, the processing device can decrease the number of write credits in the write credits register by one.

If the processing device determines that write credits are not available at operation 415, the processing device determines whether any non-deterministic read commands are in the command queue at operation 430. In one example embodiment, the processing device determines whether the command queue includes any non-deterministic read commands of the same rank as the non-deterministic write command detected at operation 410.

If the processing device determines that there are non-deterministic read commands in the command queue at operation 430, at operation 435, the processing device does not issue a dummy read command.

When the processing device determines that no write credits are available, the processing device needs a means to receive a notification that the previously transmitted write data has been committed to the non-volatile memory components and that additional write credits are available. In one example embodiment, with each non-deterministic read response received, the processing device sets the write credits register to indicate the number of write credits have become available since the last non-deterministic read response received. Accordingly, at operation 435, the processing device does not issue a dummy read command at this point, because an update to the write credits register will be returned with the response to the non-deterministic read command in the same rank in the command queue. In other words, the processing device does not need to issue a dummy read command to get an update to the write credits register.

If the processing device determines that no non-deterministic read commands are in the command queue at operation 430, at operation 440, the processing device determines whether there are dummy read commands that are outstanding. In one example embodiment, the processing device determines whether there are dummy read commands of the same rank as the non-deterministic write command detected at operation 410.

The processing device issues the dummy read command to a non-volatile memory component to receive a response to the dummy read command that indicates the number of write credits available. In one example embodiment, the processing device does not issue more than one dummy read command at a time to the same rank. If the processing device determines that there are dummy read commands that are outstanding at operation 440, at operation 435, the processing device does not issue a dummy read command.

If the processing device determines that there are no dummy read commands that are outstanding at operation 440, at operation 445, the processing device issues a dummy read command. Accordingly, at operation 445, the processing device issues a dummy read command when (i) no write credit is available in the write credits register, (ii) no non-deterministic read commands are in the command queue, and (iii) no dummy read command is outstanding. In one example embodiment, the issued dummy read command is of the same rank as the non-deterministic write command detected at operation 410. In one example embodiment, the issued dummy read command is serviced similarly to the non-deterministic read command discussed in FIG. 2.

At operation 450, the processing device sets a dummy read outstanding ("DRO") register to indicate that a dummy read command is outstanding. In one example embodiment, the processing device sets the DRO register of the rank corresponding to the dummy read command that is issued at operation 445. The DRO register set to indicate that the dummy read command is outstanding serves as an indication or reminder to the processing device not to issue another dummy read command to that rank of the channel.

At operation 455, the processing device receives a first intermediate response from the non-volatile memory component that indicates that data associated the dummy read command is available. Although, as discussed above in FIG. 2, the first intermediate response does not indicate which outstanding non-deterministic read command it corresponds to, there are no outstanding non-deterministic read commands other than the dummy read command at operation 455. Accordingly, the processing device determines that the first intermediate response is associated with the dummy read command. It is noted that while the first intermediate response indicates that data associated with the dummy read command is available, as discussed below, the response to the dummy read command can include no data. Accordingly, the first intermediate response from the non-volatile memory component can indicate that a response associated with the dummy read command is available.

At operation 460, the processing device inserts a first send command into the send queue when the first intermediate response is received. As in FIG. 2, the first send command can be inserted into the send queue of the rank associated with the first intermediate response to ensure that the first send command is made available without changing the ordering of the commands in the command queue. In one example embodiment, after operation 460, the processing device can select any deterministic command from the command queue based on the selection policy being implemented.

At operation 465, the processing device executes commands in the send queue in a first in, first out (FIFO) order. In one example embodiment, the processing device selects the first send command from the send queue to be issued and removed from the send queue. The send queue can include one or more send commands including the first send command that are simultaneously outstanding. The one or more send commands in the send queue are scheduled for servicing with priority based on a selection policy. The send queue for each rank of the channel can be serviced based on first-in, first-out order (FIFO) in the send queue. In one example embodiment, the send command indicates to a non-volatile memory component to transmit the data corresponding to a non-deterministic read command that is ready for transmission.

At operation 470, the processing device receives a response to the dummy read command. The response to the dummy read command can indicate that one write credit has become available. The response to the dummy read command also indicates an association to the dummy read command and includes no data. In this embodiment, the non-volatile memory component responding to the dummy read command places no data on the data bus when the final response is sent from the non-volatile memory component.

At operation 475, the processing device updates the write credits register by increasing a number of available write credits. In one example embodiment, the processing device increases the number of available write credits by one. At operation 480, the processing device sets the DRO register to indicate that no dummy read command is outstanding.

Figure 5:
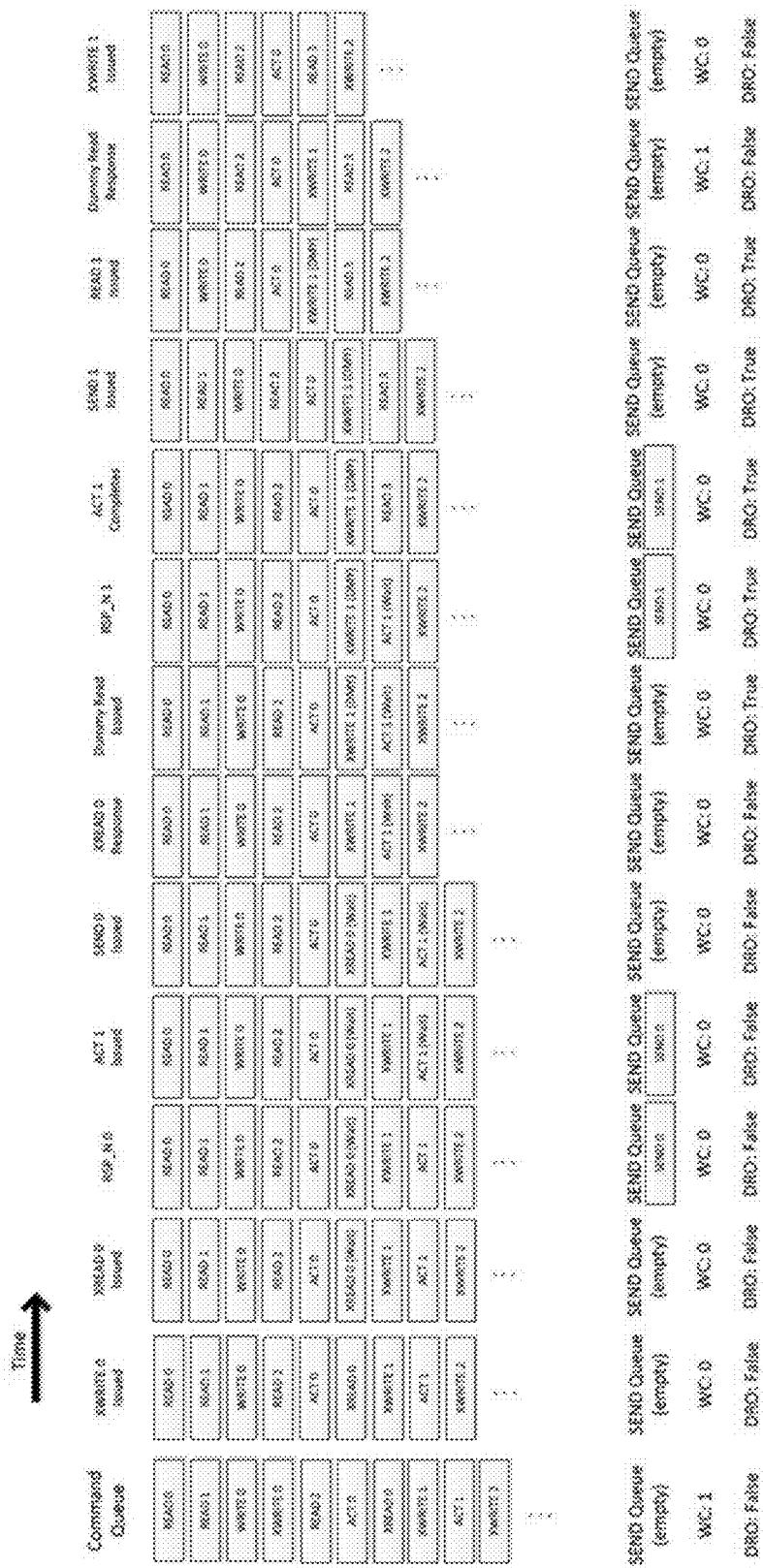
FIG. 5 is an example of the command controller supporting commands in a command queue, including a non-deterministic write command (XWRITE) in accordance to some embodiments of the present disclosure.

FIG. 5 is an example of the command controller supporting commands in a command queue, including a non-deterministic write command (XWRITE) in accordance to some embodiments of the present disclosure. In FIG. 5, at the beginning of execution (e.g., first column), the command controller has one write credit. The command controller issues a first non-deterministic write command (XWRITE 0) at the second time step and decrements the write credits register.

In this example, it is noted that, although there is another non-deterministic write command (XWRITE 1) in the queue, the command controller does not schedule a dummy read at this point, because there is a non-deterministic read command (XREAD 0) to the same rank in the command queue. Accordingly, since an update to the write counter will be returned with the response for this non-deterministic read command (XREAD 0), the command controller does not need to issue a dummy read to get an update to the write counter. In the subsequent time step (e.g., fourth column), an intermediate response (e.g., RSP_N 0) is received from a non-volatile memory component (e.g., NVDIMM-P device), so the command controller inserts a SEND command in the SEND queue.

At the fifth time step, the command controller issues the deterministic command (ACT 1) to the volatile memory components (e.g., DRAM devices). In one example embodiment, the command controller selects this deterministic command (ACT 1) based on the selection policy being implemented.

At the sixth time step, the command controller issues the queued SEND command and removes the SEND command from the SEND queue. At the seventh time step, the command controller receives the response for XREAD 0, and indicates that there are still no write credits available. At this point, the command controller recognizes that it needs to schedule a dummy read to get an update to the write credits. Thus, at the eight time step, the command controller issues the dummy read and sets the dummy read outstanding (DRO) register to true. At the ninth time step, an intermediate response (e.g., RSP_N 1) returns. The command controller inserts a SEND command into the SEND queue at the tenth time step.

At the next time step, the command controller determines that the ACT 1 completes and removes the completed ACT 1 command from the command queue and receives a new entry in the command queue. In this example, the ACT 1 command is converted to the column command (READ 3) which is a deterministic command. At the next time step, the command controller selects the SEND 1 for issue and removes the SEND 1 from the SEND queue. At the twelfth time step, the command controller selects and issues the deterministic read command (READ 1) which is a column command to the volatile memory components (e.g., DRAM devices). In one example embodiment, the command controller selects this deterministic command (READ 1) based on the selection policy being implemented. The dummy read response then returns, indicating that one write credit has become available. The command controller updates the writes credits (WC) register for that rank, which makes XWRITE 1 issuable. At the last time step in FIG. 5, the command controller issues XWRITE 1 in the last timestep shown.

Figure 6:
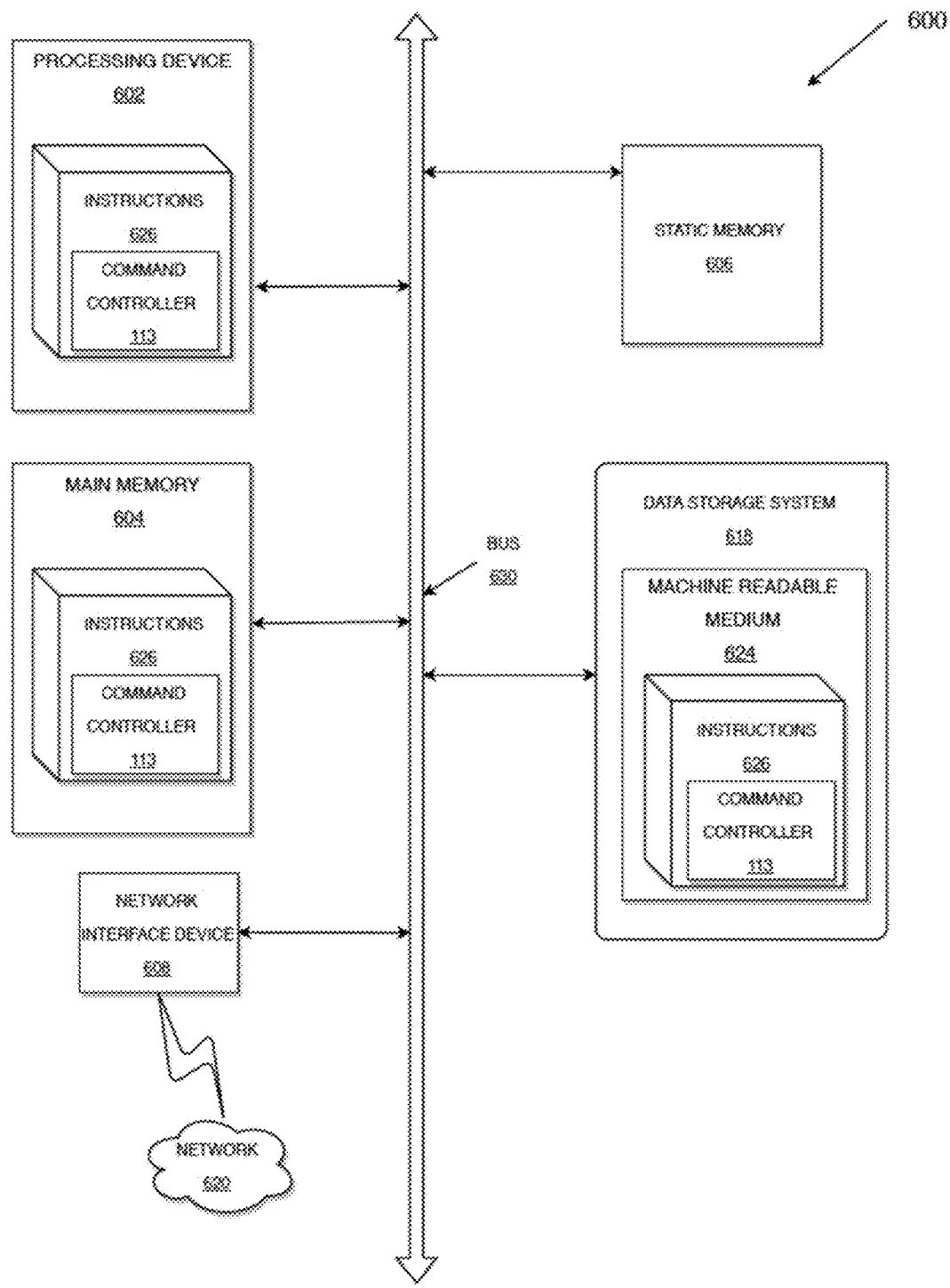
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the command controller 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, DRAM such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one example embodiment, the instructions 626 include instructions to implement functionality corresponding to a command controller (e.g., the command controller 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a plurality of memory components, the memory components comprising a volatile memory component receiving deterministic commands and a non-volatile memory component receiving non-deterministic commands; and a processing device, operatively coupled with the plurality of memory components, to perform operations comprising:

selecting, from a command queue, a first non-deterministic read command to be issued and a second non-deterministic read command, the second non-deterministic read command is in a wait state;

upon selection of the first non-deterministic read command, placing the first non-deterministic read command in the wait state;

receiving a first intermediate response from the non-volatile memory component that indicates that data associated with one of the non-deterministic read commands in the wait state is available;

inserting a first send command into a send queue when the first intermediate response is received;

executing commands in the send queue in a first-in, first-out order; and upon receiving a response to the first send command,
determining that the response to the first send command includes the data associated with the first deterministic read command, and
deleting the first deterministic read command from the command queue.

2. The system of claim 1, wherein the command queue comprises the deterministic commands and the non-deterministic commands, wherein the deterministic commands and the non-deterministic commands are interleaved in the command queue, wherein responses to the non-deterministic commands are received out-of-order.

3. The system of claim 2, wherein the processing device is further to perform operations comprising:
selecting a first deterministic command included in the command queue to be issued, wherein the first deterministic command is one of: a row activation (ACT), a read command (READ), or a write command (WRITE);
when the first deterministic command is the row activation (ACT),
upon selecting the first deterministic command, placing the first deterministic command in the wait state, and
when the first deterministic command is complete, removing the first deterministic command from the command queue, and
when the first deterministic command is the read command (READ) or the write command (WRITE),
upon selecting the first deterministic command, removing the first deterministic command from the command queue.

4. The system of claim 1, wherein the volatile memory component is a Dynamic Random-Access Memory (DRAM), and the non-volatile memory component is a Non-Volatile Dual In-Line Memory Module (NVDIMM), wherein the non-deterministic commands are NVDIMM-P commands, wherein the non-deterministic read commands are XREAD commands, and the first intermediate response is a RSP_N command.

5. The system of claim 4, wherein the non-volatile memory component is placed in a first rank of a channel and the volatile memory component is placed in a second rank of the channel.

6. The system of claim 1, wherein the send queue comprises a plurality of send commands including the first send command that are simultaneously outstanding, wherein the plurality of send commands in the send queue are scheduled for servicing with priority based on a selection policy.

7. The system of claim 1, wherein the processing device is further to perform operations comprising:
detecting a first non-deterministic write command in the command queue, wherein the first non-deterministic write command is an NVDIMM-P XWRITE command;
issuing the first non-deterministic write command when a write credit is available in a write credits register; and
decrementing the write credits register.

8. The system of claim 1, wherein the processing device is further to perform operations comprising:
detecting a first non-deterministic write command in the command queue, wherein the first non-deterministic write command is an NVDIMM-P XWRITE command;
issuing a dummy read command when no write credit is available in a write credits register, no non-deterministic read commands are in the command queue, and no dummy read command is outstanding; and
setting a dummy read outstanding ("DRO") register to indicate that a dummy read command is outstanding.

9. The system of claim 8, wherein the processing device is further to perform operations comprising:
receiving a second intermediate response from the non-volatile memory component that indicates that a response associated the dummy read command is available;
inserting a second send command into the send queue when the second intermediate response is received;
receiving a response to the dummy read command, wherein the response to the dummy read command indicates an association to the dummy read command and comprises no data;
updating the write credits register by increasing a number of available write credits; and
setting the DRO register to indicate that no dummy read command is outstanding.

10. A method comprising:
selecting, from a command queue, a first non-deterministic read command to be issued and a second non-deterministic read command, the second non-deterministic read command is in a wait state;
upon selection of the first non-deterministic read command, placing the first non-deterministic read command in the wait state;
receiving a first intermediate response from the non-volatile memory component that indicates that data associated with one of the non-deterministic read commands in the wait state is available;
inserting a first send command into a send queue when the first intermediate response is received;
executing commands in the send queue in a first-in, first-out order; and
upon receiving a response to the first send command,
determining that the response to the first send command comprises the data associated with the first deterministic read command, and
deleting the first deterministic read command from the command queue;
detecting a first non-deterministic write command in the command queue;
issuing a dummy read command when no write credit is available in a write credits register, no non-deterministic read commands are in the command queue, and no dummy read command is outstanding; and
setting a dummy read outstanding ("DRO") register to indicate that a dummy read command is outstanding.

11. The method of claim 10, further comprising:
receiving a second intermediate response from the non-volatile memory component that indicates that a response associated the dummy read command is available;
inserting a second send command into the send queue when the second intermediate response is received;
receiving a response to the dummy read command, wherein the response to the dummy read command indicates an association to the dummy read command and comprises no data;
updating the write credits register by increasing a number of available write credits; and
setting the DRO register to indicate that no dummy read command is outstanding.

12. The method of claim 10, further comprising:
issuing the first non-deterministic write command when a write credit is available in a write credits register; and
decrementing the write credits register.

13. The method of claim 10, wherein the command queue comprises the deterministic commands and the non-deterministic commands, wherein the deterministic commands and the non-deterministic commands are interleaved in the command queue, and wherein responses to the non-deterministic commands are received out-of-order.

14. The method of claim 10, wherein the send queue comprises a plurality of send commands that are simultaneously outstanding, wherein the plurality of send commands comprises the first send command, wherein the plurality of send commands in the send queue are scheduled for servicing with priority based on a selection policy.

15. The method of claim 10, wherein the volatile memory component is a Dynamic Random-Access Memory (DRAM) and the non-volatile memory component is a Non-Volatile Dual In-Line Memory Module (NVDIMM), wherein the non-deterministic commands are NVDIMM-P commands, wherein the non-deterministic read commands are XREAD commands, and the first intermediate response is a RSP_N command, and wherein the first non-deterministic write command is an NVDIMM-P XWRITE command.

16. The method of claim 15, wherein the non-volatile memory component is placed in a first rank of a channel and the volatile memory component is placed in a second rank of the channel.

17. A non-transitory computer-readable storage medium comprising instructions that, when executed by a processing device, cause the processing device to perform operations comprising:
detecting a first non-deterministic write command in a command queue;
issuing a dummy read command when no write credit is available in a write credits register, no non-deterministic read commands are in the command queue, and no dummy read command is outstanding;
setting a dummy read outstanding ("DRO") register to indicate that a dummy read command is outstanding;
receiving a first intermediate response from the non-volatile memory component that indicates that data associated the dummy read command is available;
inserting a first send command into the send queue when the first intermediate response is received;
executing commands in the send queue in a first-in, first-out order; and
receiving a response to the dummy read command, wherein the response to the dummy read command indicates an association to the dummy read command and comprises no data;
updating the write credits register by increasing a number of available write credits; and
setting the DRO register to indicate that no dummy read command is outstanding.

18. The non-transitory computer-readable storage medium of claim 17, wherein the processing device is further to perform operations comprising:
issuing the first non-deterministic write command when a write credit is available in a write credits register; and
decrementing the write credits register.

19. The non-transitory computer-readable storage medium of claim 17, wherein the command queue comprises the deterministic commands and the non-deterministic commands, wherein the deterministic commands and the non-deterministic commands are interleaved in the command queue, and wherein responses to the non-deterministic commands are received out-of-order.

20. The non-transitory computer-readable storage medium of claim 17, wherein the volatile memory component is a Dynamic Random-Access Memory (DRAM) and the non-volatile memory component is a Non-Volatile Dual In-Line Memory Module (NVDIMM), wherein the non-deterministic commands are NVDIMM-P commands, wherein the first non-deterministic write command is an NVDIMM-P XWRITE command, wherein the non-volatile memory component is placed in a first rank of a channel and the volatile memory component is placed in a second rank of the channel.

* * * * *